June 10, 1941. L. F. POOCK ET AL 2,244,964
MEASURING INSTRUMENT
Filed Oct. 21, 1939    2 Sheets-Sheet 1

Inventor
Louis F. Poock
Willis Fay Aller
Maréchal & Noé
Attorney

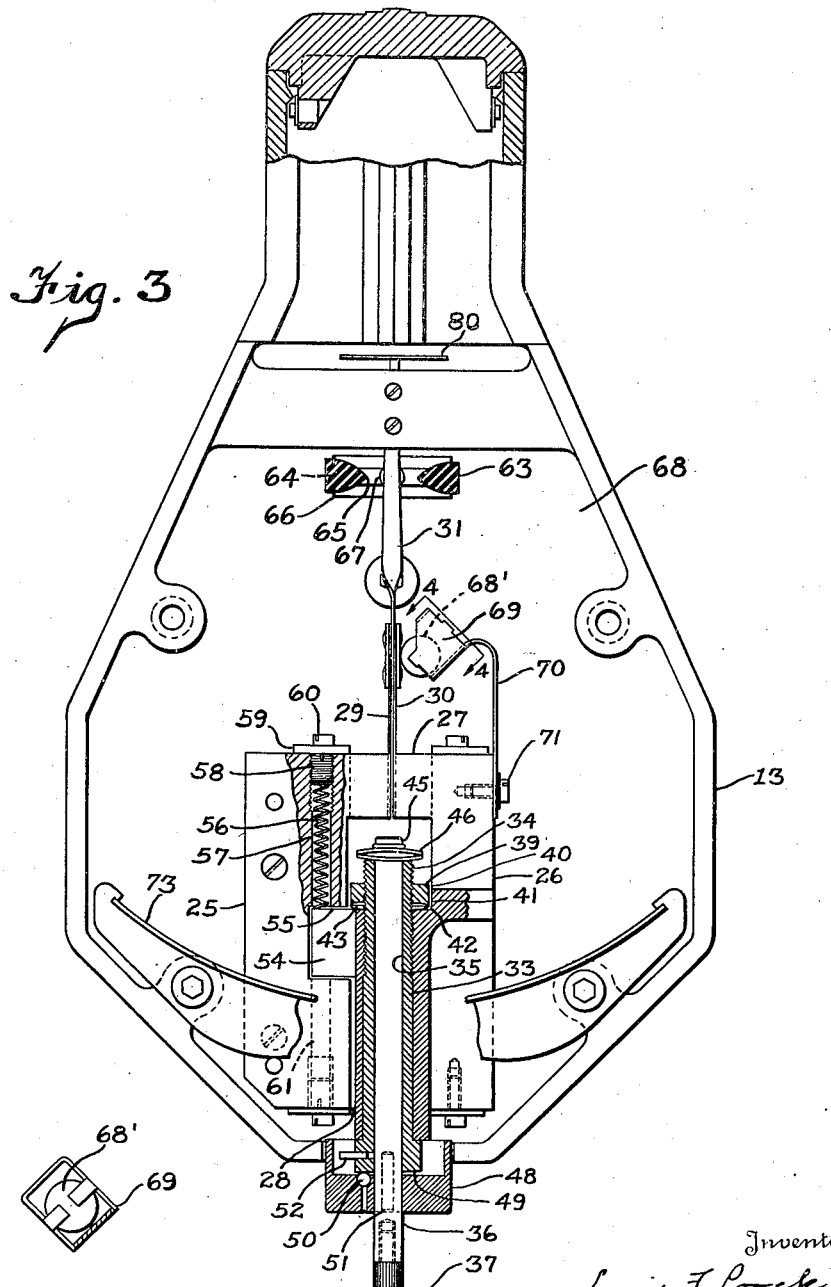

Patented June 10, 1941

2,244,964

UNITED STATES PATENT OFFICE 2,244,964

MEASURING INSTRUMENT

Louis F. Poock and Willis Fay Aller, Dayton, Ohio, assignors to The Sheffield Corporation, a corporation of Ohio Application October 21, 1939, Serial No. 300,649

16 Claims. (Cl. 33—172)

This invention relates to measuring instruments, and more particularly to measuring instruments for accurately gaging or checking size relationships such as the height or diameter of a measured part with respect to a standard part or dimension.

One object of the invention is the provision of a gaging instrument of this character, including a spring supported block which operates a gaging member and which carries a work operated part for movement therewith in a gaging operation, with simple provisions for effecting fine and coarse adjustments of the work operated part, without lost motion.

Another object of the invention is the provision of a gaging instrument in which the work operated part is axially adjustable in a rotatable adjusting member which is adjustably threaded in a spring supported block that operates a gaging or measuring member.

Another object of the invention is the provision of a gaging instrument having a work operated part that may be manually rotated throughout at least a substantial part of one revolution to effect a fine adjustment in its axial positioning, and in which further rotational movements of the work operated part effect a more rapid axial adjustment.

Another object of the invention is the provision of a gaging instrument having fixed and movable blocks that are relatively movable in a gaging operation to swing a pointer or arm, the movements of the arm beyond a predetermined range of travel which is limited by a stop for the movable block, being yieldingly restrained to prevent undue flexing of the pointer or arm.

Another object of the invention is the provision of means including a movable weight for damping oscillatory vibrations of a flexible gaging pointer or arm.

Another object of the invention is the provision of a gaging instrument having a movable block mounted by parallel spring blades on a stationary block and controlled by a work operated part to effect a gaging operation, the movable block having a plurality of oppositely acting relatively adjustable springs which maintain it yieldingly in a desired position with respect to the stationary block.

Another object of the invention is the provision of a gage in which a light beam throws a shadow of an indicating member on a visible scale which can be seen through a dark glass. the construction being such as to provide a clear view of the scale in spite of the presence of extraneous light rays.

Other objects and advantages of the invention will be apparent from the following description, appended claims and the accompanying drawings in which—

Fig. 3 is a front elevation of the gage housing, shown partly in section and with the front cover removed;

Fig. 4 is a section on the line 4—4 of Fig. 3;

Figure 2:
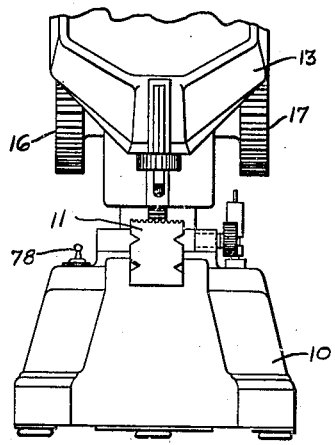
Fig. 2 is a front elevation of the lower portion of the gaging instrument.

Referring more particularly to the drawings by reference numerals, preferred forms of the invention are herein shown in a gage adapted for accurately gaging or checking size relationships such as the height or diameter of a measured part in comparison with a standard part or dimension. As shown in Figs. 1 to 4 inclusive, the gage comprises a base 10 having an anvil 11 and supporting a standard or post 12 which carries a housing or support 13 in which the gaging parts are carried. The housing has rear wing portions 14 extending around the standard and adapted for clamping engagement with the standard by means of a clamping screw 15 which is operated by a hand wheel 16 so that the housing can be fixed on the standard in desired positions. When the hand wheel 16 is turned to loosen the clamping action, the housing may be raised or lowered by turning a hand wheel 17, which rotates a shaft 18 having a gear 19 meshing with a rack 20 on the side of the standard.

Rotational movements of the shaft 18 are restrained in a yielding manner by means of a spring pressed friction shoe 20 which bears against the outer ends of the gear teeth and exerts enough pressure against the gear teeth to keep the weight of the housing 13 from causing it to drop, when the clamping action of the housing on the standard is loosened. The work engaging part which is carried by the housing is thus prevented from falling against the anvil 11 when the operator loosens the clamp wheel preparatory to turning the wheel 17. The tension of the spring 22 which holds the shoe 20' against the gear may be adjusted by turning the threaded screw 23 threaded in the housing.

The housing 13 carries a stationary block 25 and a movable block 26, the latter being supported for yielding movement by means of a pair of parallel spring blades 27 and 28 each of which is fixed at one end to the movable block and at the other end to the stationary block. The spring blade 27 extends between spaced upper portions of the blocks and the blade 28 extends across spaced lower portions of the blocks. The upper portions of these two blocks have portions that are arranged in rather closely spaced relation and the blocks are fixed respectively to the lower end of two closely spaced flexible spring strips 29 and 30, the upper ends of these spring strips being secured to a rigid arm or pointer 31. As viewed in Fig. 3, it will be apparent that up and down movements of the block 26 will cause the arm 31 to swing about a theoretical center substantially on a level with the upper ends of the blocks 25 and 26.

In the block 26 is a rotatable adjusting member or sleeve 33, having its axis parallel to the direction of reciprocatory movement of the block 26. The sleeve is provided with threads 34 engaging threads in the movable block so that it may be axially adjusted in the block as it is rotated. It also has an internal cylindrical passage 35 which receives and guides a work operated part or plunger 36, the lower end of which is provided with a gaging point 37 adapted to contact and be moved by a work piece placed upon the anvil 11. In a gaging operation, the part 36 and the sleeve 33 move in fixed relation with respect to the block 26 so that any upward movement on the gaging point causes a corresponding movement of the block 26 and this is effective in swinging the needle or arm 31 through a proportionate travel. The position of the arm 31 thus gives an indication as to the size of the work piece.

To initially set the gaging instrument so that the arm 31 shows zero on an indicating scale when the work piece being engaged is of the desired size, the work contacting part 36 may be axially adjusted in the movable block 26, the adjustments provided permitting both fine and coarse adjustments in the setting of the part 36. The coarse adjustment is effected by turning the sleeve 33, the threads 34 producing an axial movement of the sleeve and correspondingly moving the part 36. Engaging the threads 34 is a nut 39 having a flat side 40 which fits slidably against a flat surface 41 on the block 26. Between the nut 39 and an upwardly facing surface 42 on the movable block there is a pair of convex spring washers 43, facing in opposite directions and held under compression between the nut and surface 42 so that they are slightly flattened. These washers exert a constant yielding axial force on the sleeve 33 in an upward direction in all positions of adjustment of the sleeve, holding the upper sides of the threads 34 against the lower side of the threads on the movable block and thus yieldingly maintaining the sleeve in any position of adjustment. As the sleeve is turned, the nut 39 maintains the same position and the same spacing with respect to the movable block and its surface 42, since the sleeve travels axially through the nut at the same rate that it travels axially through the movable block.

The upper end of the plunger 36 projects above the top of the sleeve 33 and is provided with an enlarged portion 45, preferably a split ring fitting in a groove near the upper end of the plunger. Two oppositely facing convex washers 46 are interposed between the enlarged portion 45 and the upper end of the sleeve 33 and are held slightly compressed so as to exert a yielding pressure on the plunger 36 in an upward direction. Fixed securely on the plunger near its lower end is a hand wheel 48, the hand wheel and the sleeve providing an abutment and a slightly inclined cam surface so that as the plunger is rotated the axial position of the plunger with respect to the sleeve is changed slightly, thus providing a fine adjustment for the setting of the plunger. As herein shown the lower end of the sleeve has a surface 49, inclined at a very slight angle to a plane transverse of the axis of the plunger, and engaging a ball 50 carried by the hand wheel 48. The inclination of the surface 49 is such as to provide an axial adjustment of the plunger in the sleeve of the order of only a few ten-thousandths of an inch as the plunger is rotated throughout a substantial portion of one revolution. The spring washers 46 hold the ball 50 against the inclined surface 49 at all times and prevent any lost motion between these parts while permitting the operator to turn the wheel 48 at any time that he wishes to adjust the gage.

Fixed to the hand wheel 48 is a vertical pin 51 adapted to be moved against a pin 52 which is fixed to the lower end of the sleeve 33, each of the pins projecting into the path of the other so that nearly one complete revolution of the plunger may be effected to adjust the axial setting of the plunger in the sleeve without disturbing the setting of the sleeve in the movable block. The parts 51 and 52 then engage, and any continued movement of the hand wheel 48 causes the sleeve to be turned in the movable block and makes a coarse adjustment for the setting of the plunger. Any further fine adjustment that may be required is then effected by reversely turning the hand wheel 48 to move the plunger in the sleeve.

The fixed and movable blocks 25 and 26 are provided with cooperating stop portions which definitely limit the travel of the movable block to provide some predetermined range of adjustment of the arm 31. As herein shown, the movable block 26 has an extension tongue 54 which extends into a recess 55 in the fixed block, with sufficient space above and below the tongue 54 to permit the desired range of travel of the movable block. In the fixed block is a spring 56 arranged in a passage 57, the lower end of the spring bearing against the upper side of the tongue 54. The opposite end of the spring bears against the lower end of an adjustable stud 58 which is threaded in the upper end of the fixed block 25. A lock nut 59 holds the stud in any desired position of adjustment, and as will be apparent, the stud may be turned as by means of the screw driver slot 60 so as to increase or decrease the pressure of the spring. An opposed spring 61 of similar construction is arranged in the lower portion of the fixed block opposite the spring 56, and bearing against the lower side of the tongue 54. These two springs act in opposition to yieldingly hold the movable block in a desired position of adjustment and get the desired downward pressure of the work engaging part against the work. This pressure may be increased or decreased very readily by changing the tension of either one of the springs, and may be made to cause either an upward or downward pressure on the plunger. The springs are so adjusted as to give the desired downward force on the plunger, for making an external measurement on a work piece, and since the movements of the block 26 are yieldingly restrained in both directions by spring means, a yielding restraint is imposed on it acting in opposition to momentum forces produced by the comparatively heavy block 26 in case any sudden movement should be given to the entire gage housing. And by provision of the two springs 54 and 61, acting in opposition, and with provision for relative adjustment, the hard engaging point 37 may be replaced by an outturned finger capable of gaging the downwardly facing surface of a hollow part and held upwardly against the work by the spring force exerted by spring 61 which in this case would be sufficiently in excess of the force exerted by spring 56 to counteract the weight of the movable block 26 and the parts which it carries.

The stop surfaces provided by the tongue 54 give a limited range of travel to the arm 31, but if the arm 31 is otherwise unrestrained, in view of the fact that it is supported by flexible spring strips 29 and 30, it would tend to deflect considerably beyond this range of travel in case of a sudden movement of the block 26 to a limiting position. These oscillatory movements of the arm 31 and the excessive deflection of the strips 29 and 30 are prevented by means of yielding abutments arranged at opposite sides of the arm and adapted to be connected by the arm when it moves to a position substantially at or very slightly beyond the range of travel as limited by the stop tongue 54. The abutments as herein shown are rubber blocks 63 and 64 of substantially conical form, having their pointed ends 65 adapted for contact with the arm 31. The blocks are mounted in a metal holder 66 which is secured by means of a screw 67 on the rear wall 68 of the housing. The distance between the pointed ends of the two blocks 63 and 64 is such that they will exert no force on the arm 31 when the movable block 26 is held stationary in one limiting position or the other, but the blocks are effective in preventing the arm 31 from being deflected past its predetermined range of travel when there is a rapid movement of the block 26 to a limiting position.

To dampen oscillatory vibrations of the arm 31, one side of the arm is engaged by a weight 68', preferably in the form of a metal ball having rolling contact with the side of the arm and operating in a track or holder 69 which is carried on a metal strip 70 secured to one of the blocks. As herein shown the strip 70 is secured to the movable block 26 by means of a screw 71. The track 69 limits the movement of the ball to an inclined plane which extends upwardly away from the arm 31 so that a portion of the weight of the ball will be exerted against one side of the arm to yieldingly prevent back and forth oscillatory movements of the arm, this damping effect being produced without employing springs or resilient devices that would in themselves have a period of oscillation.

Figure 1:
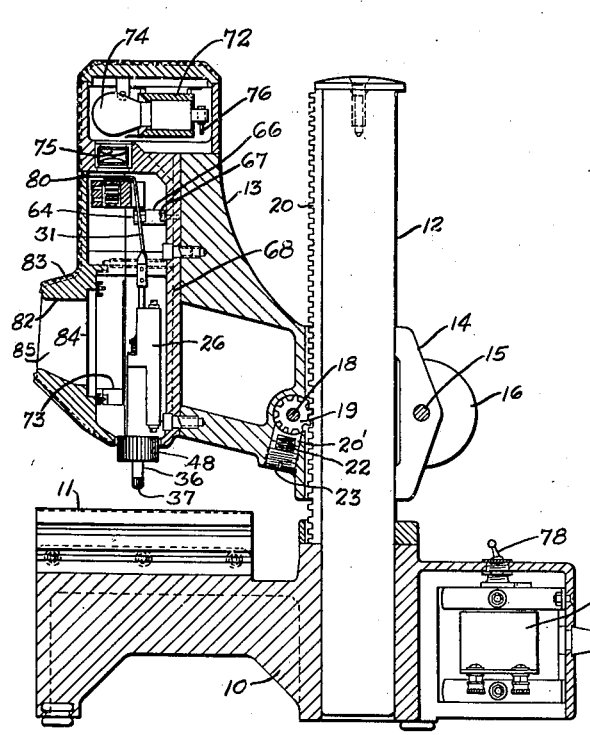
Fig. 1 is a central vertical section through a gaging instrument embodying the present invention.

The movement or position of the arm 31, in the form of construction shown in Figs. 1 to 3 inclusive, is indicated on a scale 73 by means of an optical system including a light source or lamp 74 and concentrating and straightening lenses 75. The lamp is energized through an electric conductor 76 which extends to a suitable power controlling device 77 including a switch 78 and a supply terminal plug 79 which may be connected to any suitable source of current. The lamp is preferably carried by a holder 72 which is frictionally held for vertical adjustment in the upper part of the housing. The light beams passing down towards the scale from the light source are intercepted by a target 80 provided as an outturned upper end of the arm 31, the target being extended to one side of its index surface far enough so that the entire scale will be thrown in shadow, because of interception of the light rays, when the arm 31 is in its extreme left position as viewed in Fig. 3 corresponding to a raised position of the movable block. With the gage properly set and with a piece of the desired size corresponding to the dimension of a standard part, the parts are in the position shown in Fig. 3; the spring blades 27 and 28 being straight and the needle being upright in its central position, and under such conditions the index line of the target is above the middle of the scale and only one half of the scale is in shadow, the edge of the shadow being readable on the indications on the scale to give a zero indication. The amount of deflection from this zero indication is readable on the scale to show the amount of undersize or oversize in case the part is not exactly the same size as the standard dimension.

The scale is visible through an opening 82 in the front cover wall 83 of the housing and may be viewed through a glass 84 which is arranged within a passage 85 formed by projecting portions of the cover plate of the housing which shield the glass 84 against outside illumination. As shown in Fig. 1, the wall extends out to a considerable distance substantially horizontally above the top of the glass 84 and prevents light rays directed downwardly from some external source from striking the glass 84. The glass is a dark glass, preferably blue in color, and is arranged parallel to the path of light rays moving from the light source 74 to the scale, the scale being perpendicular to the plane of the glass so that light rays will not move out towards the glass from the chamber back of the glass. With such an arrangement it has been found that the indication on the scale produced by the edge of the shadow is very clearly apparent in spite of the fact that the device may be used in a room which is brightly illuminated. The dark glass has the effect of accentuating the contrasting shadow surface and illuminated surface of the scale and gives a brighter appearance to the white illuminated scale surface as well as a darker appearance to the part in shadow.

Figure 6:
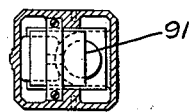
Fig. 6 is a section on the line 6—6 of Fig. 5.
Figure 5:
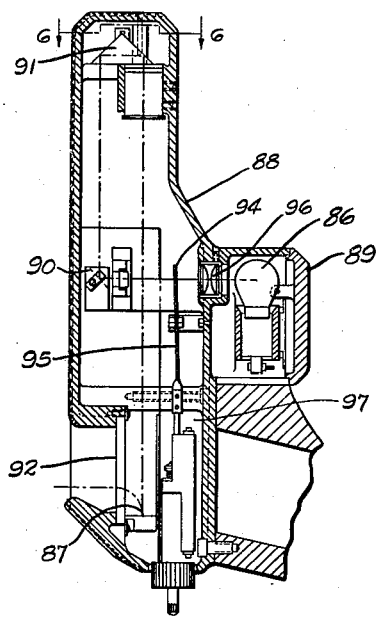
Fig. 5 is a central vertical section through the housing of a gage of somewhat modified form.

In the form of construction shown in Figs. 5 and 6 the same arrangement of spring supported block and the same provision for giving a coarse and fine adjustment to the work engaging plunger is employed. In this form, however, the path through which the light beam travels from the lamp 86 is of much greater length than the length of the beam in the form shown in Figs. 1 to 4, thus giving a greater measurement magnification in the readings visible on the scale 87. The housing 88 is arranged in a compact form so that it will not be of undue length in a horizontal direction, the lamp 86 being carried in a rearwardly extending housing compartment 89 of short length as will be apparent. The light beam travels horizontally and is then deflected upwardly by a prism 90. The upwardly traveling beam is deflected horizontally and then vertically downwardly by prism 91 and moves in a straight line to the scale 87 in a direction parallel to the blue glass 92. The target 94 is carried on the upper end of the gage arm 95 in the path of the light rays which travel from the lens 96 to prism 90.

It will thus be seen that the several prisms provide quite a long path from the target 94 to the scale 87 in a construction in which the scale is arranged transversely of the plane of the glass 92 and in which the light beams that are directed to the scale travel in a plane parallel to the glass so that the walls of the compartment 97 in which the scale is arranged, and other parts in that compartment, other than the scale itself, are not illuminated. The scale will be very clearly visible with a high degree of contrast between the parts of the scale that are in shadow and the white portions of the scale that are illuminated from the light source.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A gage comprising a support, a movable block, spring blades fixed to said block and to said support and mounting said block for reciprocatory movement, gaging means operated by said block, a rotatable adjusting member threaded in said block for axial adjustment therein, and a work operated part rotatably carried by said adjusting member and having means for moving it axially in the adjusting member as it is rotated.

2. A gage comprising a support, a movable block, spring blades fixed to said block and to said support and mounting said block for reciprocatory movement, gaging means operated by said block, a work operated part carried by said block and movable in fixed relation therewith in a gaging operation, means for axially moving the work operated part in the block to provide a fine adjustment of the axial position of the work operated part in the block, and means rotatable in the block to provide a coarse adjustment of the axial position of the work operated part in the block.

3. A gage comprising a support, a movable block, spring blades fixed to said block and to said support and mounting said block for reciprocatory movement, gaging means operated by said block, a work operated part carried by said block and movable in fixed relation therewith in a gaging operation, spring means urging said part in one direction in said block, and cam means operated by rotary movement of said part in said block for axially adjusting said part against the action of said spring means.

4. A gage comprising a support, a movable block, spring blades fixed to said block and to said support and mounting said block for reciprocatory movement, gaging means operated by said block, a rotatable adjusting member threaded in said block for axial adjustment therein, and a work operated part rotatably carried by said adjusting member, said part and said member having cooperating cam means rotatable to move said part axially in the adjusting member for fine adjustment.

5. A gage comprising a support, a movable block, spring blades fixed to said block and to said support and mounting said block for reciprocatory movement, gaging means operated by said block, a rotatable adjusting member threaded in said block for axial adjustment therein, a work operated part rotatably carried by and axially movable in said adjusting member and having means for moving said part axially as said part is rotated, and means on said part for rotating said adjusting member.

6. A gage comprising a support, a movable block, means mounting said block for reciprocatory movement, gaging means operated by said block, a rotatable adjusting member threaded in said block for axial adjustment therein, a work operated part rotatably carried by said adjusting member and having means for moving the work operated part axially in the adjusting member as said part is rotated, a handle on said part for rotating the same, and cooperating engageable means on the handle and on the adjusting member and providing a lost-motion connection between said handle and said adjusting member for operation of said adjusting member by said handle and for independent rotation of the work operated part.

7. A gage comprising a support, a movable block, means interconnecting said block and said support and mounting said block for reciprocatory movement, gaging means operated by said block, a rotatable adjusting member mounted in said block for axial and rotational adjustment therein, a work operated part rotatably carried by said adjusting member and having means for moving it axially in the adjusting member as it is rotated, spring means urging said work operated part axially in said adjusting member and spring means urging said adjusting member axially in said block to yieldingly restrain rotation of the work operated part.

8. A gage comprising a support, a movable block, spring blades fixed to said block and to said support and mounting said block for reciprocatory movement, gaging means operated by said block, a rotatable adjusting member threaded in said block for axial adjustment therein, spring means urging said adjusting member axially in said block to yieldingly restrain rotation in the block, a work operated part rotatably carried by said adjusting member and having means for moving it axially in the adjusting member as it is rotated, and additional spring means urging said work operated part axially in said adjusting member to yieldingly restrain rotation of the work operated part.

9. A gage comprising a support, a movable block, parallel spring blades fixed to said block and to said support and mounting said block for reciprocatory movement, gaging means operated by said block, a rotatable adjustment member threaded in said block, spring means urging said adjusting member axially in one direction to yieldingly restrain rotational movement of the adjusting member, a work operated part rotatably carried by said adjusting member, said work operated part and adjusting member providing an inclined surface and an abutment cooperating therewith for moving the work operated part axially in the adjusting member as the work operated part is rotated, spring means yieldingly restraining rotational movements of the work operated part in the adjusting member and maintaining said abutment engaged with the inclined surface, and cooperating engageable means on the work operated part and on the adjusting member and providing a lost-motion connection between the work operated part and the adjusting member for rotating said adjustment member by the work operated part after a predetermined rotation of the work operated part.

10. A gage comprising a stationary block, a support on which said block is fixed, a movable block, parallel spring blades fixed to said blocks and supporting the movable block for rectilinear movement, a pair of closely spaced spring strips one fixed to each of said blocks, an arm carried by both of said strips and movable in accordance with the movements of the movable block, a work engaging element for moving said movable block, opposed springs for yieldingly urging said movable block in a predetermined position, and means operable to adjust the tension of said springs to vary the gaging pressure against the work.

11. A gage comprising a stationary block, a support on which said block is fixed, a movable block, parallel spring blades fixed to said blocks and supporting the movable block for rectilinear movement, a pair of closely spaced spring strips one fixed to each of said blocks, an arm carried by both of said strips and movable in accordance with the movements of the movable block, a work engaging element for operating said movable block, a weight bearing against a side of said arm to dampen oscillatory movements of the arm, and means for guiding said weight to maintain it in engagement with the arm.

12. A gage comprising a stationary block, a support on which said block is fixed, a movable block, parallel spring blades fixed to said blocks and supporting the movable block for rectilinear movement, a pair of closely spaced spring strips one fixed to each of said blocks, an arm carried by both of said strips and operable in accordance with the movement of the movable block and having a normal vertical position, a work engaging element for operating said movable block, a round weight engaging a side of said arm for dampening oscillatory movements of the arm, and a track guiding said weight for rolling movements along a plane inclined upwardly away from the arm.

13. A gage comprising a stationary block, a support on which said block is fixed, a movable block, parallel spring blades fixed to said blocks and supporting the movable block for rectilinear movement, a pair of closely spaced spring strips one fixed to each of said blocks, an arm carried by both of said strips and operable in accordance with the movements of the movable block, a work operated member for moving said movable block, stop means positively limiting travel of the movable block to provide a predetermined range of travel of the arm, and a yielding abutment on each side of the arm and spaced therefrom to prevent any substantial vibratory over-travel of the arm in excess of said predetermined range.

14. A gage comprising a housing, a work engaging element, a member operable in said housing in accordance with the movements of said element, a light source, a scale in said housing for receiving light from said light source, said member intercepting the light source to provide an indication on the scale, said housing having an opening and a dark glass in said opening arranged substantially perpendicularly to said scale and substantially parallel to the path of the light beams received by said scale from said light source through which the scale is visible, said housing having a wall projecting out over the glass for shielding the same from outside illumination.

15. A gage comprising a housing, a work engaging element, a member operable in said housing in accordance with the movements of said element, a light source, a scale in said housing for receiving light from said light source, said member intercepting the light source to provide an indication on the scale, said housing having an opening and a dark glass in said opening arranged substantially perpendicular to the scale and substantially parallel to the path of the light beams received by said scale from said light source.

16. A gage comprising a support, a movable block, means interconnecting said block and said support and mounting said block for reciprocatory movement, gaging means operated by said block, a work operated part carried by said block and movable in fixed relation therewith in a gaging operation, cam means for axially moving the part in the block for fine adjustment of their relative positions, and additional means rotatable on the block for axially moving the part in the block to provide a coarse adjustment of their relative positions.

LOUIS F. POOCK.
WILLIS FAY ALLER.